United States Patent
Suciu et al.

(10) Patent No.: US 8,955,304 B2
(45) Date of Patent: Feb. 17, 2015

(54) GAS TURBINE ENGINE WITH MODULAR CORES AND PROPULSION UNIT

(75) Inventors: Gabriel L. Suciu, Glastonbury, CT (US); Joseph B. Staubach, Colchester, CT (US); Christopher M. Dye, San Diego, CA (US)

(73) Assignee: United Technologies Corporation, Hartford, CT (US)

( * ) Notice: Subject to any disclaimer, the term of this patent is extended or adjusted under 35 U.S.C. 154(b) by 413 days.

(21) Appl. No.: 13/370,743

(22) Filed: Feb. 10, 2012

(65) Prior Publication Data

US 2013/0205747 A1    Aug. 15, 2013

(51) Int. Cl.
| | | |
|---|---|---|
| F02K 3/00 | (2006.01) | |
| F02K 7/00 | (2006.01) | |
| F02K 9/00 | (2006.01) | |
| F02K 99/00 | (2009.01) | |

(52) U.S. Cl.
USPC ............. 60/224; 60/226.1; 60/226.3; 60/263; 60/796

(58) Field of Classification Search
USPC ...................... 60/224, 226.1, 226.3, 263, 796
See application file for complete search history.

(56) References Cited

U.S. PATENT DOCUMENTS

| | | | |
|---|---|---|---|
| 4,030,288 A | 6/1977 | Davis et al. | |
| 4,418,528 A | 12/1983 | Pellow | |
| 4,934,140 A | 6/1990 | Dennison et al. | |
| 7,631,480 B2 | 12/2009 | Suciu et al. | |
| 7,802,757 B2 * | 9/2010 | Dooley et al. | 244/60 |
| 2005/0060983 A1 * | 3/2005 | Lardellier | 60/226.1 |
| 2005/0204742 A1 | 9/2005 | Lair | |
| 2006/0185346 A1 * | 8/2006 | Rolt | 60/224 |
| 2007/0101721 A1 | 5/2007 | Dooley et al. | |
| 2009/0056309 A1 | 3/2009 | Roberge | |
| 2011/0056208 A1 | 3/2011 | Norris et al. | |

FOREIGN PATENT DOCUMENTS

EP     0082785 A2    6/1983

OTHER PUBLICATIONS

International Search Report and Written Opinion of the International Search Authority for International Application PCT/2013/024720 completed May 13, 2013.
International Preliminary Report on Patentability for PCT/US2013/024720 mailed on Aug. 21, 2014.

* cited by examiner

*Primary Examiner* — Craig Kim
(74) *Attorney, Agent, or Firm* — Carlson, Gaskey & Olds, PC

(57) ABSTRACT

A separate propulsion unit incorporating a free turbine and a fan receives gases from a plurality of core engines. The core engines each include a compressor, a turbine and a combustion section. The core engines in combination pass gases across the free turbine. A method is also disclosed.

15 Claims, 4 Drawing Sheets

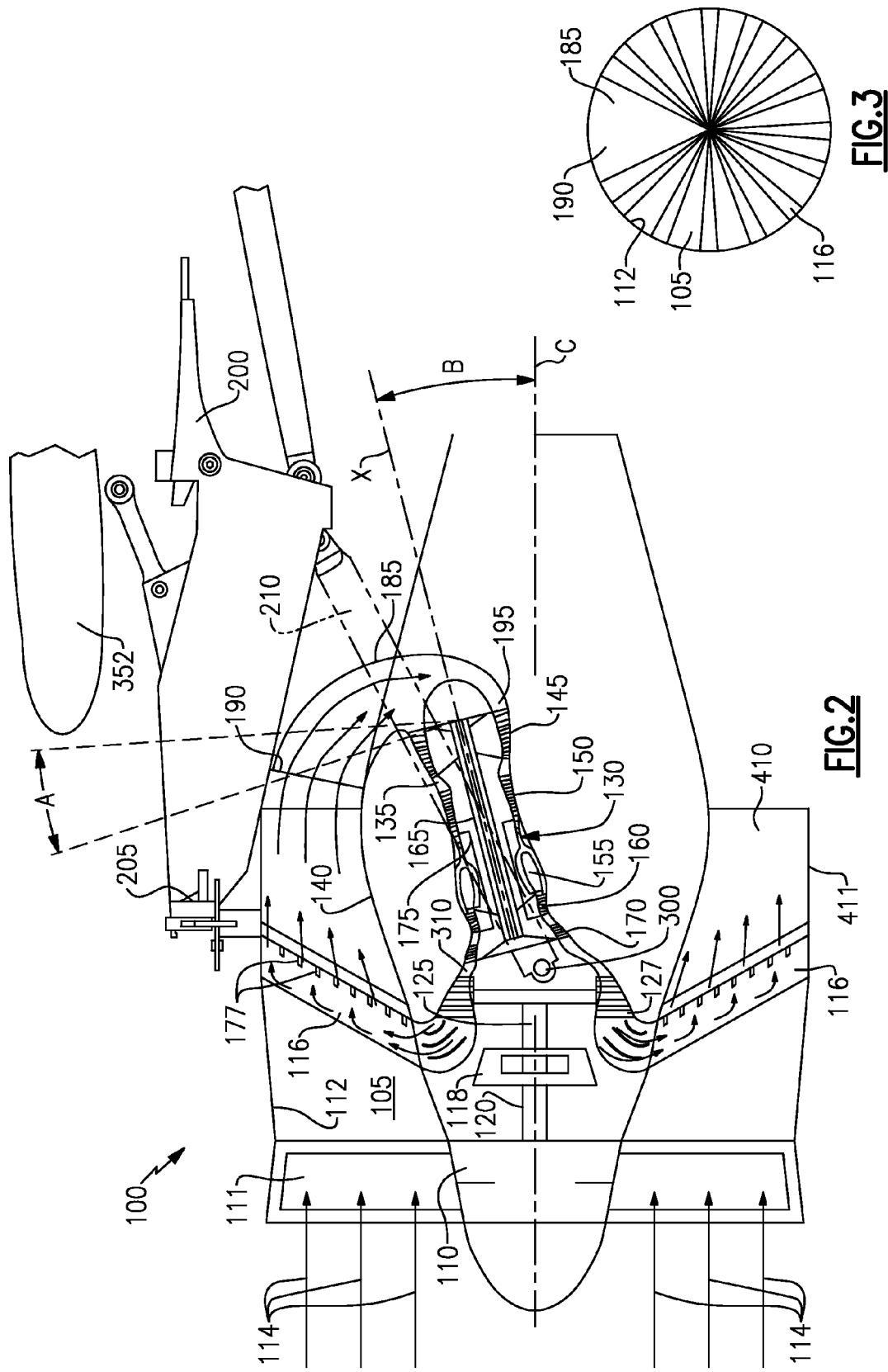

GAS TURBINE ENGINE WITH MODULAR CORES AND PROPULSION UNIT

BACKGROUND OF THE INVENTION

This application relates to a gas turbine engine, wherein a core engine is mounted separately from a propulsion unit.

Gas turbine engines are known, and have typically included a fan delivering a portion of air into a bypass duct, and a second portion of air into a core flow leading into a compressor section. The air is compressed in the compressor and delivered downstream into a combustion section where it is mixed with fuel and ignited. Products of this combustion pass across turbine rotors which are driven to rotate, and in turn rotate the compressor and fan section. Historically one turbine section drove both a compressor stage and a fan at the same speed. More recently it has been proposed to incorporate a gear reduction such as the fan can rotate at slower speeds than the compressor stage. With this arrangement, the outer diameter of the fan can increase, and the outer diameter of the turbine and compressor sections can decrease.

Historically, the fan and compressors have been mounted coaxially, and have been driven by turbines that are at a rear end of the engine, with the fan and compressor at a forward end. It has typically not been possible to service any portion of the engine, without removing the concentrically rotating turbines, compressors and fan as a combined unit. At a minimum, service is made complex by the inter-relationships of these sections.

SUMMARY OF THE INVENTION

In a featured embodiment, a gas turbine engine has a propulsion unit including a fan, and a free turbine connected to drive the fan about a first axis. A plurality of core engines include at least a compressor, a combustion section, and a turbine. The core engine turbine is connected to drive the compressor. The compressor and core engine turbine rotate about a second axis. The plurality of core engines has an output from the core engine turbines passing over the free turbine.

In another embodiment according to the previous embodiment, a gear reduction is provided between the free turbine and fan.

In another embodiment according to the previous embodiment, the fan delivers propulsion air into a main duct downstream of the fan.

In another embodiment according to the previous embodiment, an inlet to the core engine is from an ambient inlet separate from the main duct. \

In another embodiment according to the previous embodiment, an inlet duct delivers air from the main duct downstream of the fan across the plurality of core engines.

In another embodiment according to the previous embodiment, a connecting duct communicates gases downstream of the core engine turbines from the plurality of core engines across the free turbine.

In another embodiment according to the previous embodiment, gases downstream of the common free turbine are directed back into the main duct.

In another embodiment according to the previous embodiment, gases directed downstream of the common free turbine are directed into the main duct through struts.

In another embodiment according to the previous embodiment, core engines are mounted to rotate about an angle which is generally perpendicular to a rotational axis of the fan.

In another embodiment according to the previous embodiment, the fan delivers propulsion air into a main duct downstream of the fan.

In another embodiment according to the previous embodiment, an inlet to the core engine is from an ambient inlet separate from the main duct.

In another embodiment according to the previous embodiment, an inlet duct delivers air from the main duct downstream of the fan across the plurality of core engines.

In another embodiment according to the previous embodiment, gases downstream of the common free turbine are directed back into the main duct.

In another embodiment according to the previous embodiment, gases directed downstream of the common free turbine are directed into the main duct through struts.

In another featured embodiment, a method of providing a gas turbine engine includes the steps of providing a propulsion unit incorporating a free turbine and a fan, and mounting a plurality of core engines to the propulsion unit, with the core engines each including a compressor, a turbine and a combustor, such that the plurality of core engines in combination provide gases to drive the free turbine.

In another embodiment according to the previous embodiment, free turbine drives the fan through a gear reduction.

In another embodiment according to the previous embodiment, an inlet duct taps air from a main duct downstream of the fan, with the single inlet duct delivering air into the plurality of core engines.

In another embodiment according to the previous embodiment, the fan delivers propulsion air into a main duct.

In another embodiment according to the previous embodiment, air delivered into the plurality of core engines coming from an ambient ram inlet.

In another embodiment according to the previous embodiment, the plurality of core engines receive inlet air from a tap into the main duct.

In another embodiment according to the previous embodiment, a single connecting duct communicates gases downstream of the plurality of core engines across the free turbine.

In another featured embodiment, an aircraft incorporating at least one gas turbine engine has an aircraft wing mounting a gas turbine engine. The gas turbine engine includes a propulsion unit including a fan, and a free turbine connected to drive the fan about a first axis, and a plurality of core engines. The core engines include at least a compressor, a combustion section, and a turbine. The core engine turbine is connected to drive the compressor. The compressor and core engine turbine rotate about a second axis. The plurality of core engines has an output from the core engine turbines passing over the free turbine.

These and other features of this application will be best understood from the following specification and drawings, the following of which is a brief description.

BRIEF DESCRIPTION OF THE DRAWINGS

FIG. 2 is a cross-sectional view of an inventive gas turbine engine.

FIG. 3 is a partial view of a portion of the FIG. 2 engine.

DETAILED DESCRIPTION

Figure 1:
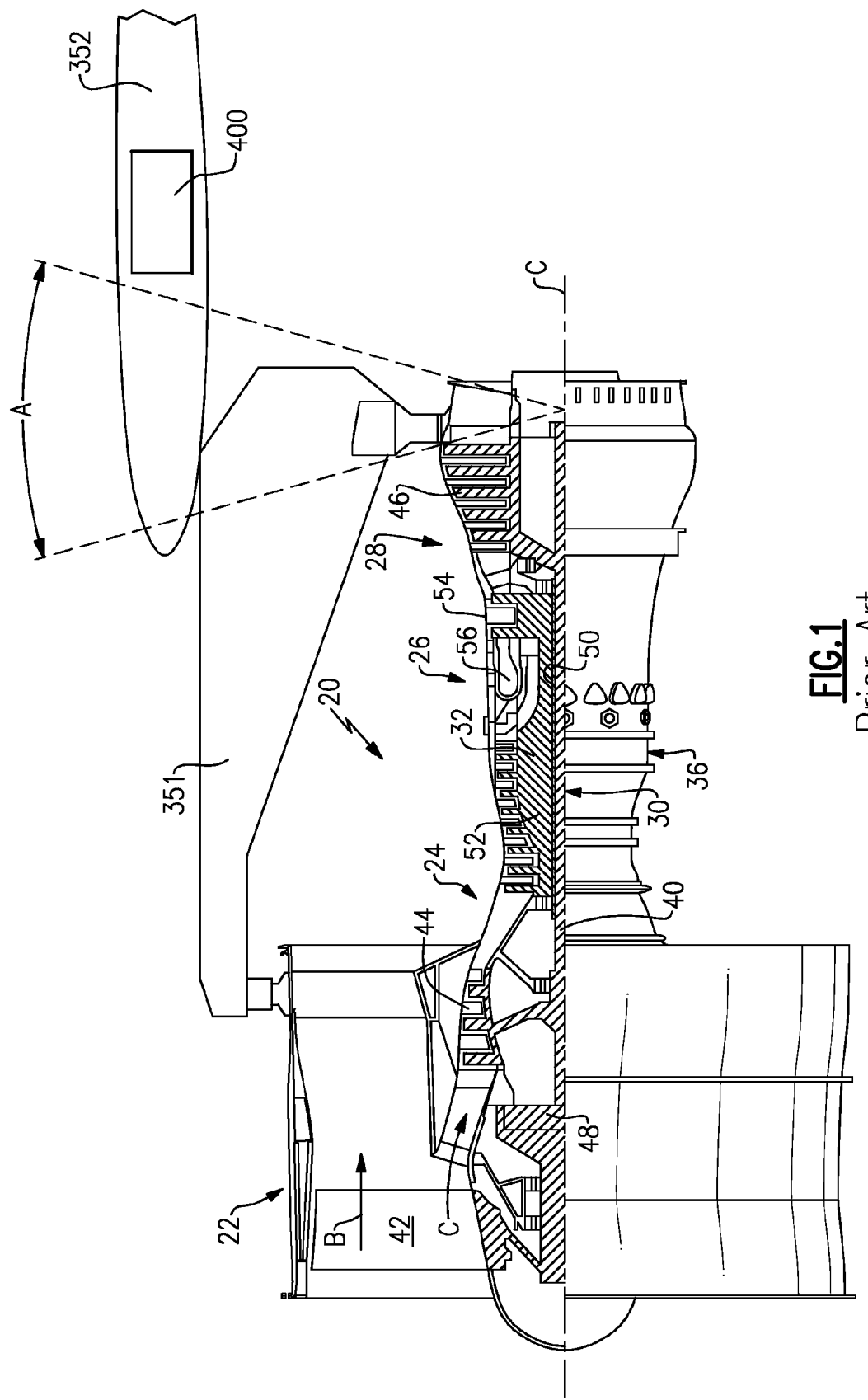
FIG. 1 schematically shows a prior art gas turbine engine.

FIG. 1 schematically illustrates a known gas turbine engine 20. The gas turbine engine 20 is disclosed herein as a twospool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis C relative to an engine static structure 36.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. The inner shaft 40 and the outer shaft 50 are concentric and rotate about the engine central longitudinal axis C which is collinear with their longitudinal axis.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion.

An aircraft wing 352 is shown with the gas turbine engine 20 mounted somewhat forwardly of the engine. A pylon 351 mounts the gas turbine engine to the wing 352. As shown, a disk burst zone A extends for about 30° across an exit point of the gas turbine engine. This is an area where portions of the gas turbine engine which may fracture, such as portions of the rotor disks, could fly outwardly and damage the wing, as an example. A limitation on the design of where to mount a gas turbine engine is that the disk burse zone A cannot extend across the area where a fuel tank 400, shown schematically, is mounted. Thus, this has somewhat limited the mounting of gas turbine engines in the past.

As can be appreciated from FIG. 1, the turbines, compressors are all inter-related and rotate on a common axis with the extending spools 30/32. As can be appreciated from FIG. 1, it is somewhat difficult to remove the turbine, compressors, or fans separately from one another for service.

FIG. 2 shows an inventive engine 100. Air at 114 approaches a fan rotor 111 which is driven to rotate with a fan hub 110. A shaft 120 is driven through a gear reduction 118, which is in turn driven by a shaft 125. Shaft 125 is driven by a free turbine 127. A duct 310 communicates products of combustion from a core engine 130 that includes low pressure turbine 170, a high pressure turbine 160, a combustor 155, and a compressor section including a high pressure compressor 150 and a low pressure compressor 145. A spool 165 rotates the low pressure spool while a spool 175 rotates the high pressure spool.

An inlet duct 195 communicates air from a turning duct 185 into the low pressure compressor 145. An opening 190 takes air from a main duct 105. A pylon 200 mounts the engine 100 to an aircraft wing 352.

A centerline X of core engine 130 incorporating the compressor sections 145, 150, combustor 155 and compressor sections 160 and 170 is offset by an angle B from a center line C of the shaft 120/125. Thus, the fan rotor 111 rotates about axis C while the core engine 130 rotates about an axis X, which is offset by an angle B. The angle B may be some non-zero angle, or as described below, may be zero in at least some embodiments. In embodiments which position the core engine to be offset, the angle B may be greater than zero and less than or equal to about 90°. Note, other angles can be utilized. The burst zone features are maximized across this range.

For purposes of the FIG. 2 embodiment, and for moving the burst zone A, the angle B should be greater than zero.

As further shown, a strut 210 extends from the pylon 200 and mounts to the duct 310.

In the engine 100, rather than delivering air into a core airflow at a fan side of the engine, all of the air is delivered into the duct 105. A propulsion unit including the free turbine 127, gear reduction 118, and fan rotor 111 deliver this air beyond struts 116, and to an outlet 410 of a cowl 411. This provides the bulk of the propulsion for the engine. The inlet 190 into the turning duct 185 takes a portion of the air and delivers it into the inlet 195 for the compressor 145. The air is compressed, delivered into the higher compressor section 150, into the combustion section 155, and across turbines 160 and 170, which in turn drive the compressors 150 and 145. Outlet gases downstream of the turbine section 170 passes through the duct 310, and is driven across the free turbine 127. The free turbine 127 drives gear reduction 118 to in turn cause the fan blades 111 to rotate.

Air downstream of the free turbine section 127 passes back outwardly and into the duct 105 through openings in struts 116.

As can be appreciated from FIG. 2, since the core engine 130 is mounted at an axis which is non-parallel to the axis C, the disk burst zone A is shifted, or angled, forwardly away from the wing 352. Now, the engine may be mounted further rearwardly underneath the wing than has been the case in the prior art. Essentially, a core engine, mounted at an axis which is non-parallel to the axis of a propulsion unit C would achieve this benefit whenever the axis X is mounted to extend toward the wing 352. That is, if the angle B has at least a component extending toward the wing 352 from the propulsion unit drive axis C, then this forward movement of the disk burst zone A will be achieved. The amount of movement can be controlled by changing the size of the angle B. A method of selecting the angle B to position to disk burst zone A such that the engine can be mounted further rearwardly under the wing would also be apparent from the above disclosure.

As can be appreciated in FIG. 3, there are a plurality of struts 116 delivering air back into the duct 105. Generally the struts which deliver air into the duct are not aligned with the opening 190 into the turning duct 185.

Figure 4:
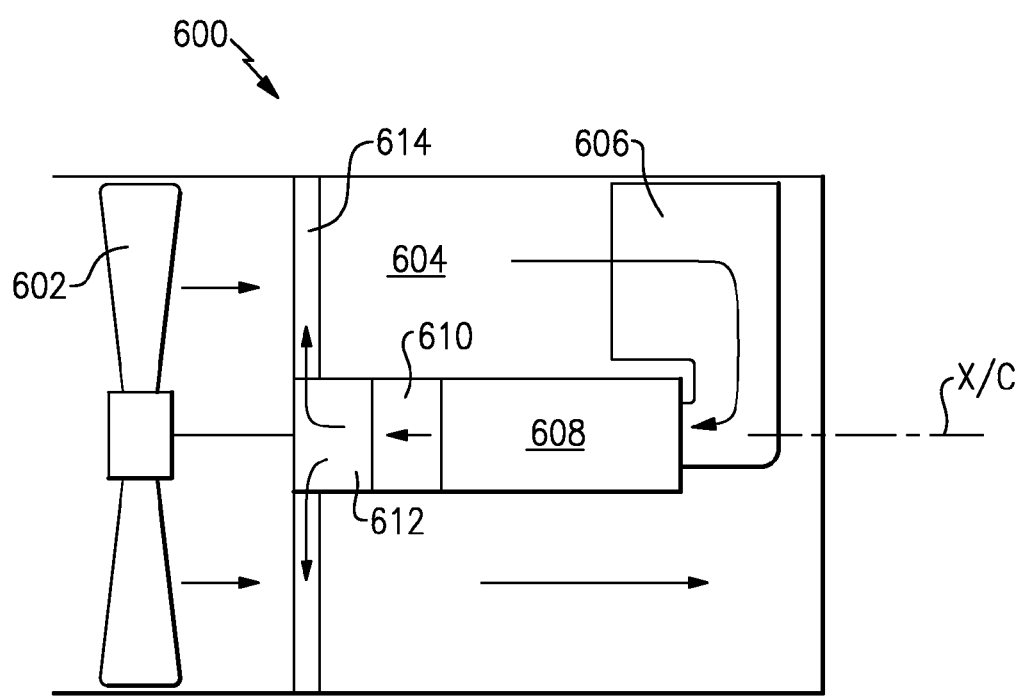
FIG. 4 is an alternative embodiment.

An embodiment 600 is shown schematically in FIG. 4. As shown, a core engine 608 may communicate gas flow from an inlet duct 606, through a compressor and turbine section as shown in FIG. 2. Products of the combustion downstream of the turbine sections in the core engine 608 pass into a connecting duct 610, and then across a free turbine 612. The free turbine 612 may drive the fan rotor 602. The outlet gas from the free turbine 612 may be directed through the struts 614 and into a main duct 604. As shown in this Figure, there is a separate propulsion unit including the free turbine 612 and fan rotor 602. This may also include a gear reduction in some embodiments. The separate propulsion unit is positioned forward or toward the inlet of the gas turbine engine 600, while the core engine is spaced rearwardly of the propulsion unit, and is separate from the propulsion unit. With this embodiment, servicing of the core engine relative to the propulsion unit is simplified compared to the prior art.

The fan 602 is positioned at an inlet end of a main air duct 604. The free turbine is between the inlet end and the core engine 608 relative to an axial dimension extending along a rotational axis of the fan, and from the inlet end toward an outlet end of the main duct.

Figure 5C:
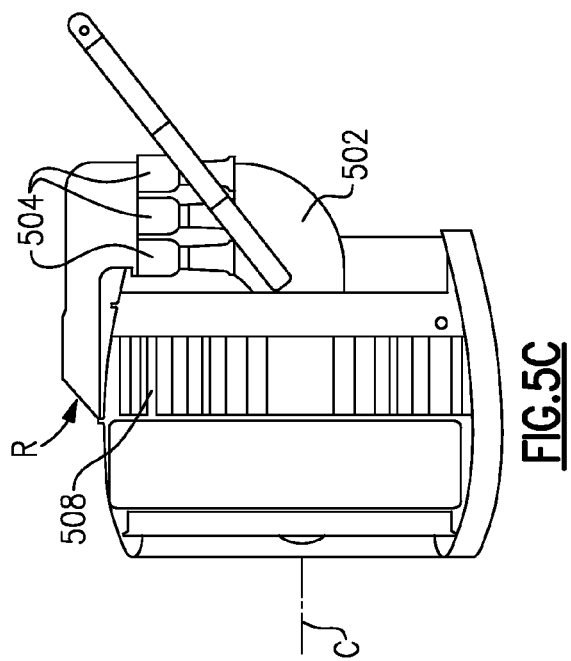
FIG. 5C shows yet another embodiment.
Figure 5B:
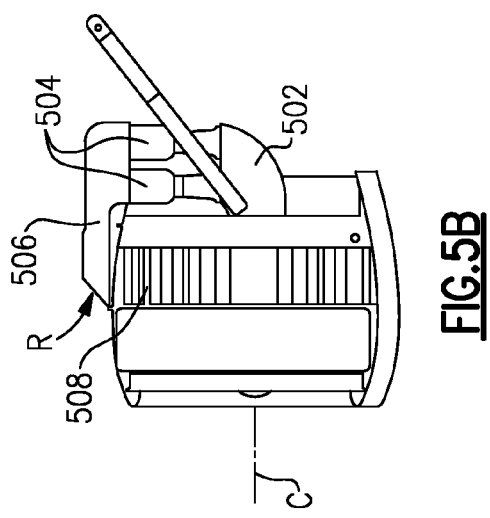
FIG. 5B shows an alternative embodiment.
Figure 5A:
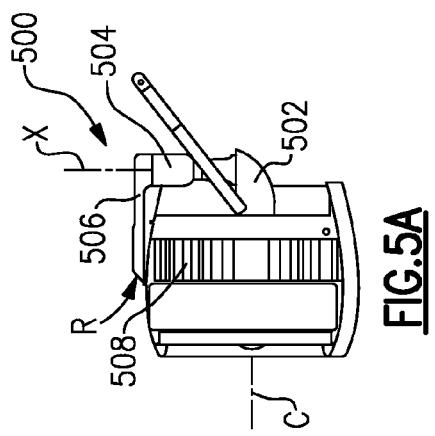
FIG. 5A shows a first embodiment.

FIGS. 5A-5C show the power of having a separate propulsion unit and core engines in providing modular sizing. The propulsion units 508 can be greatly increased in size. Thus, for example, FIG. 5A shows a 30,000 thrust pound engine, FIG. 5B a 60,000 thrust pound engine and FIG. 5C a 90,000 thrust pound engine. The propulsion units 508 are all sized up accordingly. A duct 506 receives ram ambient air from an ambient inlet as shown at R, and directs it into a core engine 504. The core engine 504 has an output which communicates with a connecting duct 502, which communicates products of combustion back to a free turbine within the propulsion unit 508. Of course, the use of a turning duct within the main duct, as shown for example in FIG. 2, may be used here.

As shown in the FIG. 5A, the axis of rotation C of the propulsion unit is perpendicular to the axis of rotation X of the core engine 504.

However, other orientations can be utilized such as shown in the above embodiments. When it is desired to size the propulsion unit up, a second core 504 may be utilized as shown in FIG. 5B. In this manner, only a single core need to engineered, and several sizes of engine can be achieved by simply adding additional cores. As can be appreciated in FIG. 5B, the size of the ducts 506 and 502 may be larger given the twin cores.

FIG. 5C shows the use of three cores. Of course, any number of cores can be utilized to achieve increased sizing of the thrust capacity of an engine. The internal mechanical and fluid details of the FIG. 5A-C embodiments may be as shown in FIGS. 1-4.

Details of FIGS. 1-4 are claimed in co-pending U.S. Application Ser. No. 13/370,750 filed on even date herewith, now U.S. Pat. No. 8,789,354, granted Jul. 29, 2014, and entitled "Gas Turbine Engine With Separate Core and Propulsion Unit."

The core engines not only allow economies from the modular engines, but also provide redundancies to protect against the failure of any one of the core engines.

Although an embodiment of this invention has been disclosed, a worker of ordinary skill in the art would recognize that certain modifications would come within the scope of this invention. For that reason, the following claims should be studied to determine the true scope and content of this invention.

The invention claimed is:

1. A gas turbine engine comprising:
a propulsion unit including a fan, and a free turbine connected to drive said fan about a first axis;
a plurality of core engines, said core engines including at least a compressor, a combustion section, and a turbine, said core engine turbine connected to drive said compressor, and said compressor and said core engine turbine rotating about axis non-coaxial to said first axis;
said plurality of core engines having an output from said core engine turbines passing over said free turbine; and
said propulsion unit being positioned forwardly, and toward and inlet of the gas turbine engine relative to said core engines, and said core engines spaced rearwardly of the propulsion unit, and being separate from said propulsion unit.

2. The gas turbine engine as set forth in claim 1, wherein a gear reduction is provided between said free turbine and said fan.

3. The gas turbine engine as set forth in claim 1, wherein said fan delivering propulsion air into a main duct downstream of said fan.

4. The gas turbine engine as set forth in claim 3, wherein an inlet to said core engines is from an ambient inlet separate from said main duct.

5. The gas turbine engine as set forth in claim 3, wherein an inlet duct delivers air from said main duct downstream of said fan across said plurality of core engines.

6. The gas turbine engine as set forth in claim 3, wherein a connecting duct communicates gases downstream of said core engine turbines from said plurality of core engines across said free turbine.

7. The gas turbine engine as set forth in claim 6, wherein gases downstream of said free turbine are directed back into said main duct.

8. The gas turbine engine as set forth in claim 7, wherein gases directed downstream of said common free turbine are directed into said main duct through struts.

9. A gas turbine engine comprising:
a propulsion unit including a fan, and a free turbine connected to drive said fan about a first axis;
a plurality of core engines, said core engines including at least a compressor, a combustion section, and a turbine, said core engine turbine connected to drive said compressor, and said compressor and said core engine turbine rotating about axis non-coaxial to said first axis;
said plurality of core engines having an output from said core engine turbines passing over said free turbine; and
wherein said core engines are mounted to rotate about axis which are generally perpendicular to said first axis of said fan.

10. The gas turbine engine as set forth in claim 9, wherein said fan delivering propulsion air into a main duct downstream of said fan.

11. The gas turbine engine as set forth in claim 10, wherein an inlet to said core engines is from an ambient inlet separate from said main duct.

12. The gas turbine engine as set forth in claim 10, wherein an inlet duct delivers air from said main duct downstream of said fan across said plurality of core engines.

13. The gas turbine engine as set forth in claim 12, wherein gases downstream of said common free turbine are directed back into said main duct.

14. The gas turbine engine as set forth in claim 13, wherein gases directed downstream of said common free turbine are directed into said main duct through struts.

15. An aircraft incorporating at least one gas turbine engine comprising:
an aircraft wing mounting a gas turbine engine;
said gas turbine engine including a propulsion unit including a fan, and a free turbine connected to drive said fan about a first axis, a plurality of core engines, said core engines including at least a compressor, a combustion section, and a turbine, said core engine turbines connected to drive said compressor, and said compressor and said core engine turbine rotating about axis non-coaxial to said first axis, said plurality of core engines having an output from said core engine turbines passing over said free turbine; and said propulsion unit being positioned forwardly, and toward an inlet of the gas turbine engine relative to said core engines, and said core engines spaced rearwardly of the propulsion unit, and being separate from said propulsion unit.

* * * * *

UNITED STATES PATENT AND TRADEMARK OFFICE
CERTIFICATE OF CORRECTION

PATENT NO. : 8,955,304 B2  
APPLICATION NO. : 13/370743  
DATED : February 17, 2015  
INVENTOR(S) : Gabriel L. Suciu et al.

Page 1 of 1

It is certified that error appears in the above-identified patent and that said Letters Patent is hereby corrected as shown below:

IN THE CLAIMS:

In claim 1, column 5, line 63; delete "axis" and replace with --axes--

In claim 9, column 6, line 34; delete "axis" and replace with --axes--

In claim 9, column 6, line 37; delete "axis" and replace with --axes--

In claim 9, column 6, line 38; delete "axis" and replace with --axes--

In claim 15, column 6, line 64; delete "axis" and replace with --axes--

Signed and Sealed this  
Tenth Day of November, 2015

Michelle K. Lee  
*Director of the United States Patent and Trademark Office*